US009747455B1

(12) United States Patent
McClintock et al.

(10) Patent No.: US 9,747,455 B1
(45) Date of Patent: Aug. 29, 2017

(54) DATA PROTECTION USING ACTIVE DATA

(71) Applicant: Amazon Technologies, Inc., Seattle, WA (US)

(72) Inventors: Jon Arron McClintock, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 14/561,044

(22) Filed: Dec. 4, 2014

(51) Int. Cl.
*H04L 29/06* (2006.01)
*G06F 21/60* (2013.01)
*H04L 29/08* (2006.01)

(52) U.S. Cl.
CPC .............. *G06F 21/60* (2013.01); *H04L 67/10* (2013.01)

(58) Field of Classification Search
CPC ......... G06F 21/60; G06F 21/55; H04L 67/10; H04L 63/1441; H04L 63/1491; H04L 63/1458; H04L 2463/141
USPC .......................................................... 726/26
See application file for complete search history.

(56) References Cited

U.S. PATENT DOCUMENTS

| 8,943,594 B1* | 1/2015 | Arrowood | G06F 21/53 726/23 |
| 2006/0161989 A1* | 7/2006 | Reshef | G06Q 10/107 726/26 |
| 2010/0077483 A1* | 3/2010 | Stolfo | G06F 21/554 726/24 |
| 2013/0097696 A1* | 4/2013 | Baker | H04L 63/1441 726/17 |
| 2014/0101724 A1* | 4/2014 | Wick | H04L 63/1491 726/4 |

* cited by examiner

*Primary Examiner* — Yogesh Paliwal
(74) *Attorney, Agent, or Firm* — Davis Wright Tremaine LLP

(57) ABSTRACT

Data of an organization or other entity may be protected using active data objects. The data may be storage in a storage system maintained by the organization or a separate organization. The data storage system may receive request for data, if the request violates one or more constraint conditions, the storage system may provide in response to the received request active data. The active data may include executable code that, when executed by a computer system, causes depletion of one or more resources used by a computer system executing the code.

20 Claims, 10 Drawing Sheets

| Database | | | |
|---|---|---|---|
| Field A | Field B | Field C | Field D |
| ID #1 | 140 | ID #6 | 22 |
| ID #1 | 20 | 💣 102 | 💣 102 |
| 💣 102 | 1 | ID #8 | 14 |
| ID #4 | 45 | ID #9 | 46 |
| ID #5 | 42 | 💣 102 | 105 |

DATA PROTECTION USING ACTIVE DATA

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as needed and depending on their needs. The proliferation of network computing and storage has expanded access to data belonging to computing resource providers, content providers, and online merchants. Some of this data may be confidential with only a limited number of parties granted access to the data. However, identifying and preventing unauthorized access or use of the information may not always be possible.

BRIEF DESCRIPTION OF THE DRAWINGS

Various embodiments in accordance with the present disclosure will be described with reference to the drawings, in which.

DETAILED DESCRIPTION

Figure 1:
FIG. 1 is an illustrative example of a database including data protection using decoy records comprising active data in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to information security and data protection through the use of active data including a payload comprising executable code. The executable code, when executed by a computer system, may cause a variety of different results configured to protect information included in the active data or information an attacker attempts to obtain when receiving the active data. For example, the active data may be included in a record of a database. When an attacker attempts to obtain information from the database record, the active data may prevent the attacker from obtaining the information. When data is stored in a data service or data store, it may be transformed, for example, compressed, Extensible Markup Language (XML) encoded, or otherwise obfuscated through the interpretation of a coded series of operations. In these cases however, the data may be readily retrievable without needing to know a secret, distinguishing these operations from encryption. Therefore, in some embodiments, the data may be processed without needing to reverse the transformation or decrypt the data. The data service or data store may be operated by a computing resource service provider or other organization.

When data maintained by the data service or data store is transformed, as described above, decoy records may be included along with the maintained data. The decoy records may include active data configured to deplete resources of a computer system attempting to access the data, for example, by reversing the transformation. The computing resource service provider may include a large number of decoy records in the data service or data store in order to increase the probability of an attacker obtaining a decoy record. The decoy records may be included in such a way that the decoy records are difficult to distinguishable from other records maintained by the data service or data store. By including the decoy records the computing resource service provider may, sometimes without carrying out computations to determine an attack is occurring, prevent the attacker from utilizing data stored by the data service or data store. The decoy records may include active data and/or a payload which, when executed, may attempt to exploit vulnerabilities in common implementations of the relevant algorithms which may be used by an attacker.

In various embodiments, all of the data maintained by the data service or data store is at least partially active, i.e., the data comprises at least some decoy data that includes executable code. Additionally, the data service or data store may be configured to detect unauthorized access to the data and provide in response to the unauthorized access decoy data. For example, queries to the data service may require a particular flag or value to be included in the request in order to obtain a record. An interface of the data service may be configured to determine if the particular flag or value is included in a query and, if the particular flag or value is not included in the query, provide decoy data in response to the query. The decoy data may include executable code that are wrapped so that functionality associated with the executable code is unidentifiable or at least obfuscated. In various embodiments, the decoy data is configured to detect if the decoy data has be exfiltrated from a computing environment of the computing resource service provider. The decoy data may include executable code that, when executed by one or more processors of a computer system, cause the computer system to determine that it has been exfiltrated. As a result of the determination, the executable code may cause the computer system to initiate transmission of an alert or notification to a central reporting site. The alert or notification may include identifying information to aid the investigation of the exfiltration. Furthermore, the decoy data may include executable code configured to prevent the attacker from utilizing the exfiltrated data.

FIG. 1 is an illustrative example of a database 100 containing one or more decoy records. The database 100 may be an organized collection of data, the data may be organized into one or more records. The database 100 may be operated by a computing resource service provider as described above. Furthermore, a database management service or other computer system may provide an interface for users to interact with the database 100, for example, the interface may enable users to input, store, retrieve, or manage the data maintained by the database 100. In various embodiments, the computing resource service provider may operate the database 100 on behalf of one or more customers and the data stored in the database 100 may be customer data. At least a portion of the database 100 may contain information considered confidential by the computing resource service provider or the one or more customers. In order to protect the confidential information the database may include decoy records 102. The decoy records 102 may comprise active data, described in greater detail below.

The active data may contain a payload that when executed or otherwise interacted with by a computer system performs a function such as rendering the computer system inoperable, deleting data, or other operation suitable for protecting data maintained by the database 100. For example, the active data may comprise a payload including a zip bomb, XML bomb, busy beaver function, or other executable code capable of disabling the computer system interacting with the active data. A zip bomb may be an archive file, such as an archive file of the decoy record 102, designed to crash or render useless the program and/or system interacting with the zip bomb. Rather than subverting or altering the normal operation of the program and/or computer system, the active data may allow the program and/or computer system to work as intended, but the payload or other portion of the active data may be configured such that unpacking it (e.g. by a database program operated by the attacker) requires inordinate amounts of time, disk space and/or memory.

Additionally, the database 100 may contain several type of decoy records 102 with different levels of active data. For example, a first level of active data may include a payload configured to return forensic information corresponding to the attacker and computer systems utilized by the attacker. In another example, a second level of active data may include a payload configured to disable the attacker's computer system. The database 100 may also contain interleaved records and decoy records 102 on the hard disk drive or other storage device containing the database. The interleaved records and decoy records 102 may be configured such that if the entire database 100 is stolen it may be more difficult for the attacker to filter out the decoy records 102 from the other records of the database 100. In various embodiments, each record of the database 100 contains active data, computer systems with an antidote may be able to access the records without experiencing exhaustion and/or depletion of computing resources or other negative results of interacting with the payload contained in the active data. For example, the payload of the active data may be configured to exploit a vulnerability of an open source version of a relational database management system (RDBMS) such that when the RDBMS interacts with the records an error occurs and information may not be obtained from the record. The computing resource service provider may alter the open source version of the RDBMS such that, when executed by computer systems of the service provider, the error caused by the payload does not occur.

Figure 2:
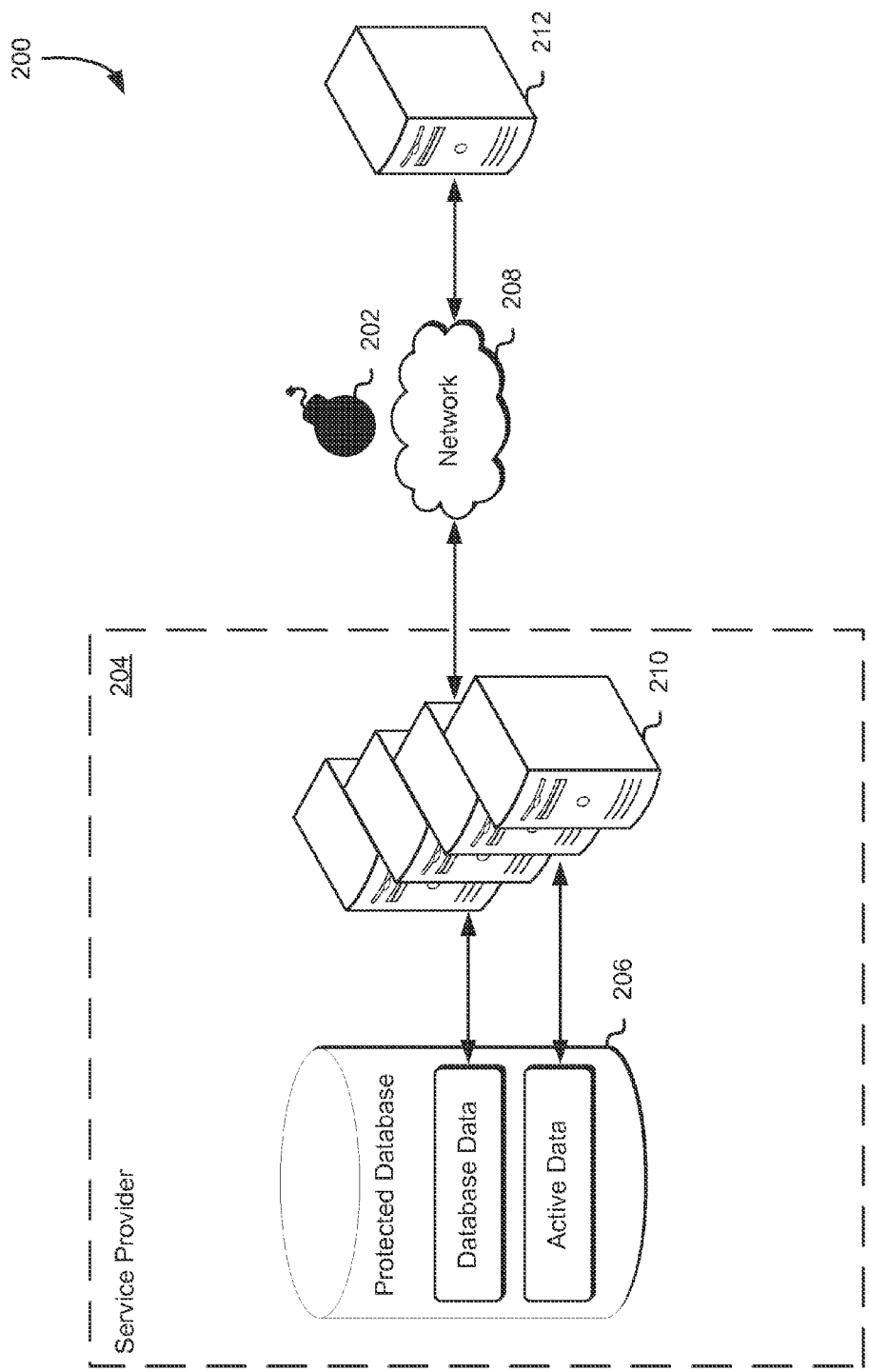
FIG. 2 is an environment illustrating a computing resource service provider using active data to protect data maintained by the service provider in accordance with an embodiment.

FIG. 2 illustrates an environment 200 in which a data storage service 210 may protect data maintained by the data storage service 210 using decoy records 202 comprising active data in accordance with an embodiment. The data storage service 210 may be a service of a computing resource provider 204 used to operate a database such as described above in connection with FIG. 1. As illustrated in FIG. 2, the data storage service 210 includes various subsystems such as a protected database 206. The data storage service 210 may include various other subsystems, not shown in FIG. 2 for simplicity, such as a request processing subsystem and a management subsystem. The data storage service 210 may also include a plurality of data storage servers, which may store various data objects and metadata about the various data objects stored among the data storage servers. Users 212 may submit requests to interact with data objects maintained by the data storage device 210 through a network 208, whereby the network 208 may be a communication network, such as the Internet, an intranet or an Internet service provider (ISP) network. At least a portion of the request may correspond to a user 212 attempting to attack the data storage service 210. An attack may include any attempt to obtain, access, or interact with data considered confidential by the computing resource service provider 204 and/or that the user 212 is not allowed to obtain, access, or interact with.

In an embodiment, the request processing subsystem is a collection of computing resources, such as webservers and application servers, collectively configured to process requests submitted to the data storage service 210. The request processing subsystem, for example, may include one or more webservers that provide a web service interface to enable users 212 of the data storage service 210 to submit requests to be processed by the data storage service 210. The request processing subsystem may include computer systems configured to make various determinations in connection with the processing of requests, such as whether policy allows fulfillment of a request, whether requests are authentic (e.g., electronically signed using a suitable cryptographic key), whether the request includes the correct flag or other value, and whether a decoy record 202 or other record should be returned in response to the request. Additionally, the data storage service 210 may place one or more constraint conditions on request, request violating the one or more constraint conditions may receive from the data storage service 210 a decoy record comprising active data. The one or more constraints may include the type of requests or queries that are allowed by the data storage service 210 or an amount of requests or queries that may be submitted to the data storage service 210. Furthermore the one or more constraints may include constraints on information or values to be included in the query such as a flag, credentials, a token, IP address, determined value, or other information that may be determined without executing the query. Additionally, the one or more constraints may include constraints on results of the query, for example, a maximum or minimum number of records that satisfy the query.

Components of the request processing subsystem may interact with other components of the data storage service 210 (e.g., through network communications). For example, some requests submitted to the request processing subsystem may involve the management of computing resources which may include data objects stored by the data storage servers 210. The request processing subsystem, for example, may receive and process requests to access a data object stored in the protected database 206. The request processing subsystem may indicate to the management subsystem whether to return database data or active data. The data objects may be logically organized into logical data containers. In various embodiments, there is a single container for decoy data in order to reduce overhead required for the protected database 206. Additionally, the protected database 206 may include an application for generating decoy data and/or active data in response to a request. For example, the protected database 206 may contain an application that is configured to compress requested records into a zip bomb as described above. Data objects associated with a logical data container may, for example, be said to be in the logical data container. Requests to the management subsystem may also include requests for creating logical data containers, deleting logical data containers, providing an inventory of a logical data container, providing or updating access control policy with respect to one or more logical data containers and the like. Other requests that may be processed by the request processing subsystem include requests to perform operations in connection with data objects. The requests, for example, may include requests to upload data objects to the data storage service 210, to download data objects from the data storage service 210, to delete data objects stored by the data storage service 210 and/or other operations that may be performed.

Requests processed by the request processing subsystem that involve operations on data objects (upload, download, delete, e.g.) may include interaction between the request processing subsystem and one or more data storage servers. As described above, the data storage servers may provide storage for the data storage service 210, such as the protected database 206. The data storage servers may be computer system communicatively coupled with one or more storage devices for the persistent of data objects. For example, in order to process a request to download a data object, the request processing subsystem may transmit a request to a data storage server to obtain the data object. If however the request from the user 212 is invalid, not allowed by a policy, unauthenticated, or otherwise corresponds to an attack, the request processing subsystem may modify or replace the request such that the request, when processed by the protected database 206, returns decoy data. It is noted, however, that in some embodiments, client (e.g., customer) computer systems may transmit data directly to the data storage servers instead of through servers in the request processing subsystem. Other factors may be considered in determining whether the request corresponds to an attack such as a size of the result send returned in response to the request, a modification to the column order of the response, wildcards included in the request, an unexpected table join included in the request, an indication from an intrusion detection system or bot detection system, or other abnormality detected in the request.

In some embodiments, the request processing subsystem transmits data to multiple data storage servers for the purposes of redundantly storing the data to allow the retrievability of data in the event of failure of an individual data storage server and/or associated data storage device. For example, in some embodiments, the request processing subsystem uses a redundancy in coding scheme such as erasure coding to deconstruct a data object into multiple parts that are stored among the data storage servers. The parts may be configured such that if access to a certain number of parts is lost, the data object may be nevertheless be reconstructible from the remaining parts that remain accessible.

To enable efficient transfer of data between the request processing subsystem and the data storage servers and/or generally to enable quick processing of requests, the request processing subsystem may include one or more databases that enable the location of data among the data storage servers. For example, the request processing subsystem may operate a key value store that serves to associate identifiers of data objects with locations among the data storage servers for accessing data of the data objects. As used herein, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

Figure 3:
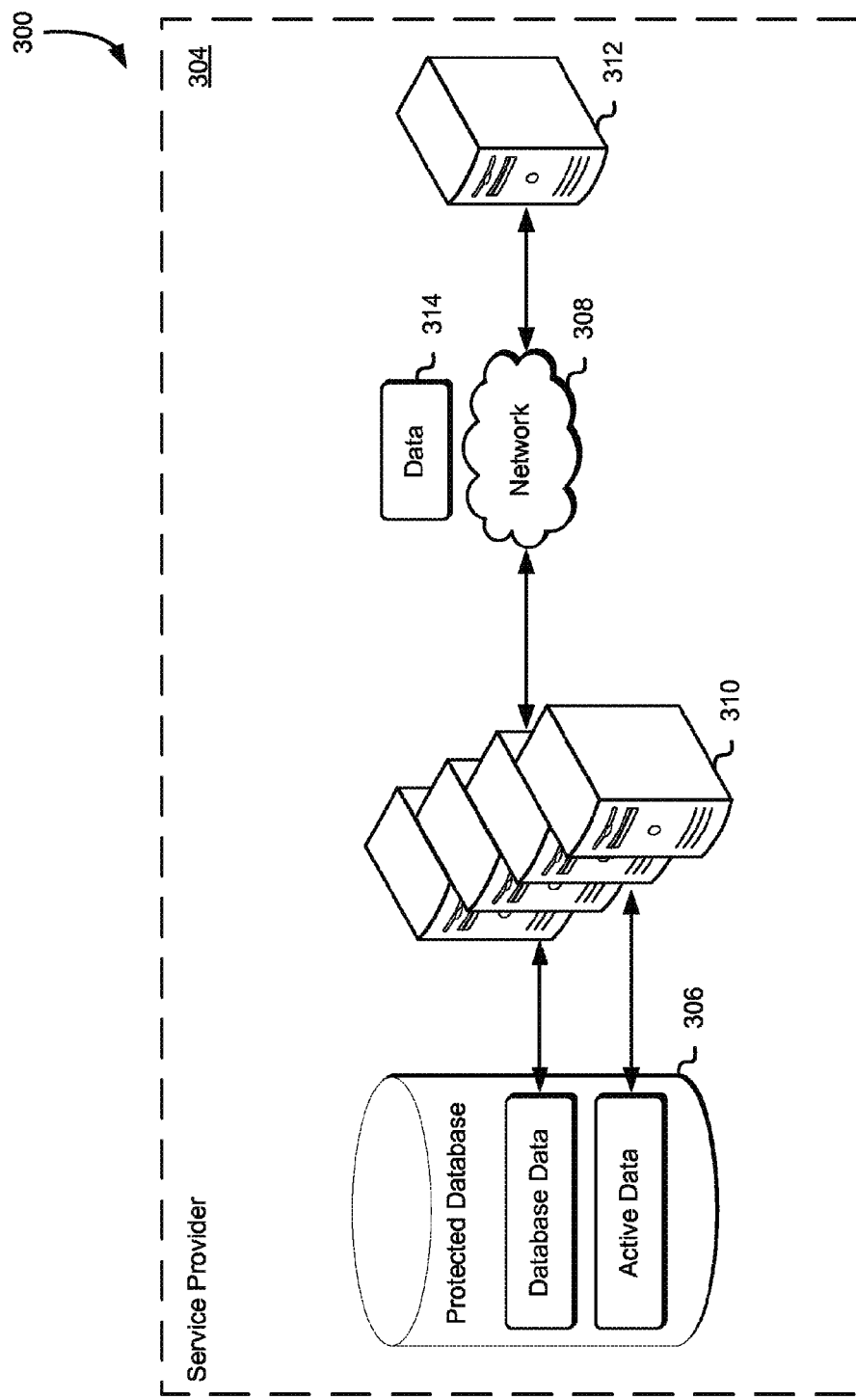
FIG. 3 is an environment illustrating a computing resource service provider enabling data access based at least in part on one or more attributes of a data request in accordance with an embodiment.

FIG. 3 illustrates an environment 300 in which a data storage service 310 may protect data maintained by the data storage service 310 using location aware active data in accordance with an embodiment. The data storage service 310 may be a service of a computing resource provider 304 used to operate a database such as described above in connection with FIG. 1. As illustrated in FIG. 3, the data storage service 310 includes various subsystems such as a protected database 306. The data storage service 310 may include various other subsystems, not shown in FIG. 2 for simplicity, such as a request processing subsystem and a management subsystem described in greater detail above in connection with FIG. 3. The data storage service 310 may also include a plurality of data storage servers, which may store various data objects and metadata about the various data objects stored among the data storage servers. Users 312 may submit requests to interact with data 314 maintained by the data storage service 310. As illustrated by FIG. 3, the user 312 may utilize other computing resources of the computing resource service provider 304. For example, the user 312 may be another service of the service provider or may be computing resources provided to a customer of the computing resource service provider 304.

The request processing subsystem may receive a request for data objects from the user 312 and determine that the request originates from within the computing resource service provider environment. As a result, the request processing subsystem may cause the data storage service 310 to provide the requested data. If, however, the request processing system determines that the request from the user 312 does not originate from the computing resource service provider environment, the request processing subsystem may cause the data storage service 310 to return a decoy record comprising active data as described above. As illustrated in FIG. 3, the user 312 may submit a request over a network 308. The network may be an internal network to the computing resource service provider 304. The request processing subsystem and/or data storage service may be configured to enable access to data 314 to computing resources connected to the network 308.

In various embodiments, the data 314 may comprise active data as well as the requested data object. The computing resource operated by the user 312 requesting the data 314 may be configured such that the payload does not harm the computing resources. For example, the computing resource service provider 304 may maintain a split Domain Name System (DNS) record inside the computing resource service provider environment and outside the computing resource service provider environment. The payload included in the active data may be configured to check the DNS record prior to activating the payload's functionality. If the DNS information indicated that the computing resources interacting with the payload in the computing resource service provider environment the functionality is not executed. However, if the DNS record indicates the computing resources interacting with the payload is outside the computing resource service provider environment the functionality of the payload is executed. The location aware active data may use a variety of different mechanisms to determine if the computing resources are within the computing resource service provider environment. Furthermore, the computing systems interacting with the data 314 may be configured with an antidote or other safety mechanisms which may prevent the execution of the functionality of the payload. The code included in the payload may be configured to detect the antidote and prevent or terminate execution of at least a portion of the payload causing depletion of the computing resources.

Figure 4:
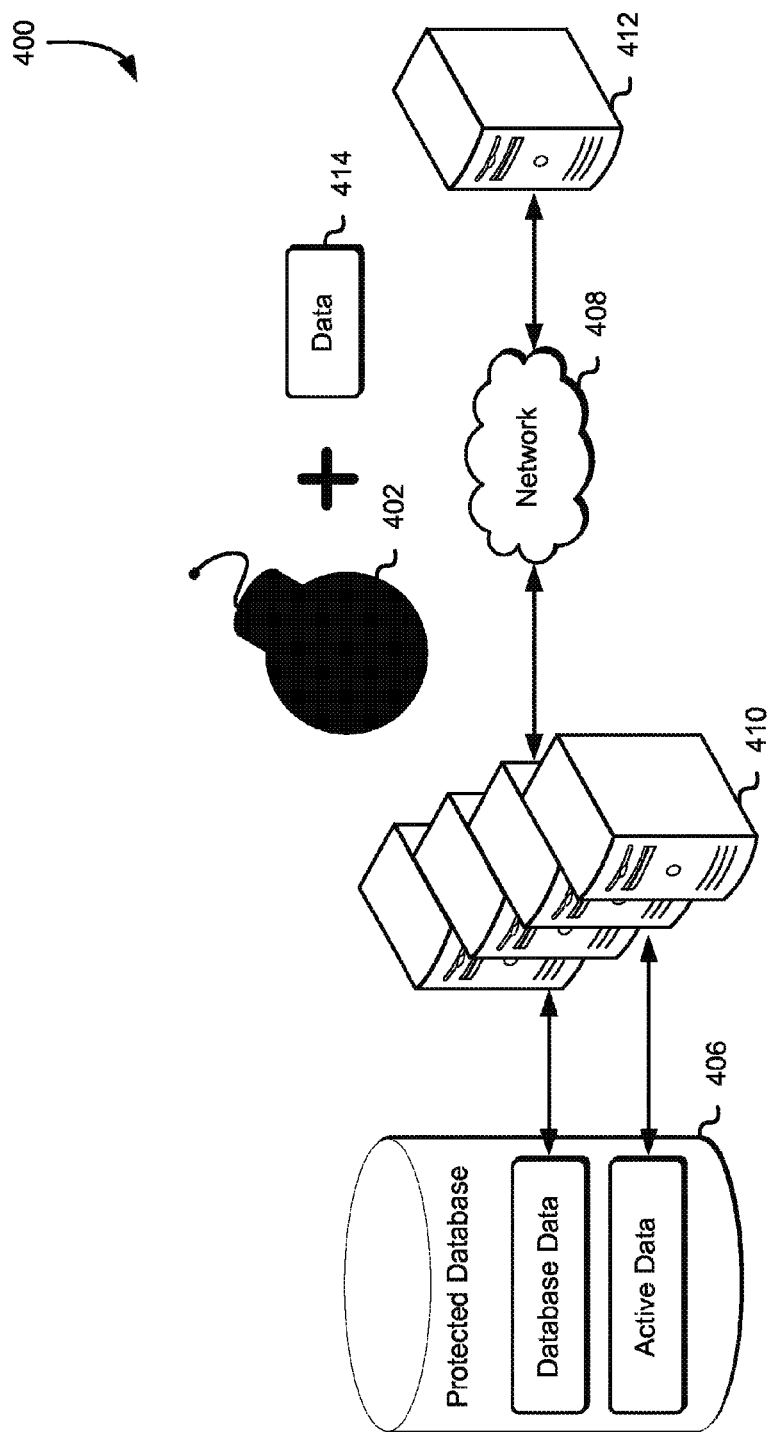
FIG. 4 is an environment illustrating a computing resource service provider using active data to protect data maintained by the service provider in accordance with an embodiment.

FIG. 4 illustrates an environment 400 in which a data storage service 410 may protect data maintained by the data storage service 410 by including active data 402 with data object 414 of the data storage service 410. The data storage service 410 may, as described above, be a service of a computing resource provider 404 used to operate a database such as described above in connection with FIG. 1. As illustrated in FIG. 4, the data storage service 410 includes various subsystems such as a protected database 406. The protected database 406 may store data objects 414 along with active data 402. The data storage service 410 may also include various other subsystems, not shown in FIG. 4 for simplicity, such as a request processing subsystem and a management subsystem described in greater detail above in connection with FIG. 2. The data storage service 410 may also include a plurality of data storage servers, which may store various data objects and metadata about the various data objects stored among the data storage servers. Users 412 may submit requests to interact with data object 414 maintained by the data storage service 410. As illustrated by FIG. 4, the user 412 may submit a request to interact with data objects 414 using computing resources, such as a desktop computer, mobile phone, tablet, or other computer system.

The data storage service 410 may include a database, web service, web application, or other web enabled service, file share, file server, data storage site, or other computer system configured to store data. As illustrated by FIG. 4, the data objects maintained by the data storage service may include active data 402. The active data 402 may include a payload, described in greater detail below, the payload enable a variety of data protection functions. For example, the active data 402 may be configured to transmit information to the data storage service 410 and/or computing resource service provider 404 corresponding to the user 412 interacting with the data object 414. The information may include a variety of information relating to the user 412 and/or computer system utilized by the user 412, such as the Internet Protocol (IP) address, geographic location, trace route, or other information corresponding to the user 412. Furthermore, the computer system utilized by the user 412 may be configured such that the functionality of the payload of the active data 402 is not executed or does not alter the operation of the computer system. For example, the computer system utilized by the user 412 may be configured to recognize the payload of the active data 402 and not execute the functionality included in the payload. In another example, the computer system utilized by the user 412 may be configured such that execution of the payload of the active data 402 does not render the computer system inoperable.

Figure 5:
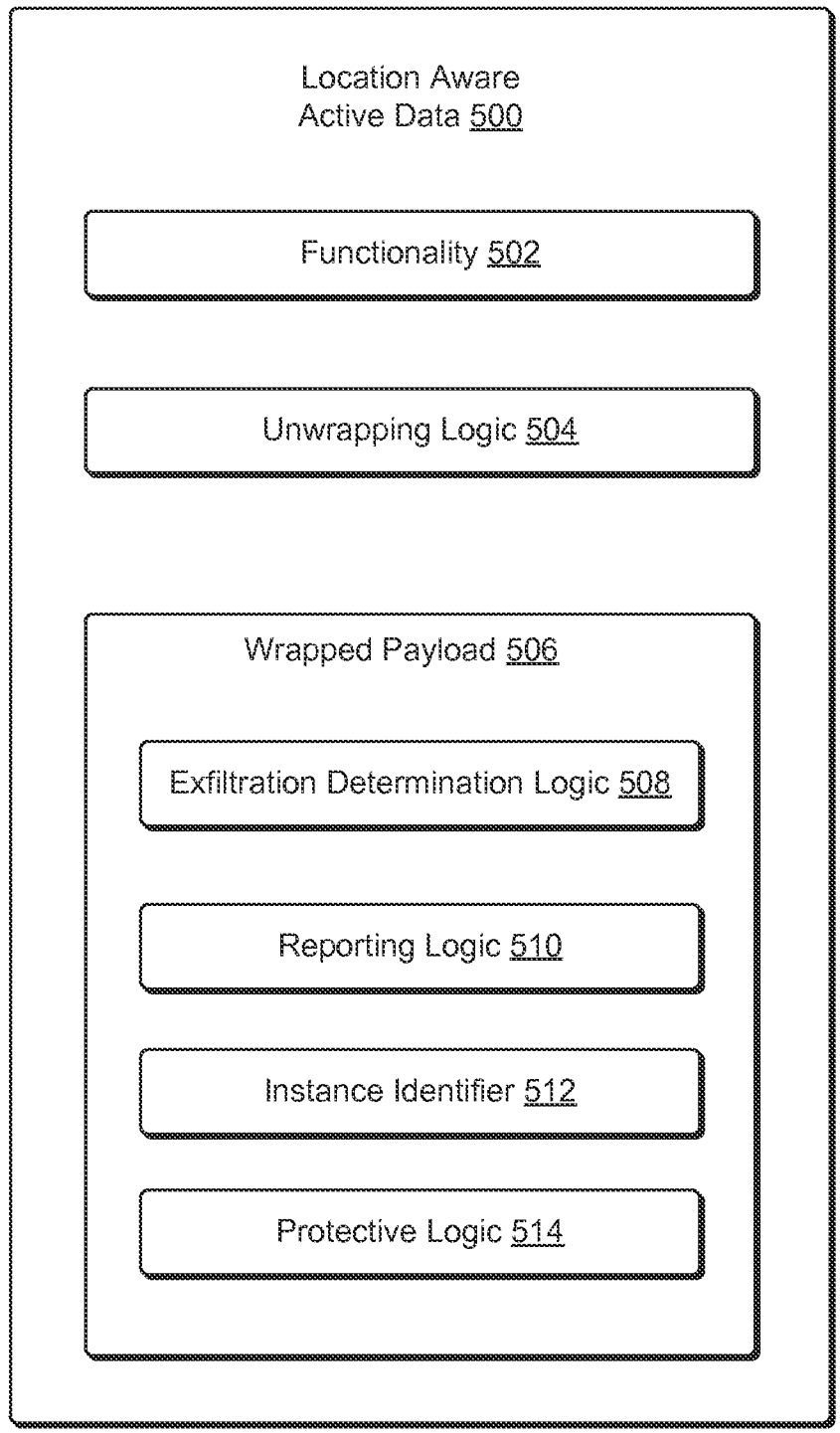
FIG. 5 is an example illustrating location aware active data in accordance with an embodiment.

FIG. 5 is a diagram depicting an example of location aware active data 500 in accordance with an embodiment of the present disclosure. In the example of FIG. 5, the location aware active data 500 includes functionality 502, unwrapping logic 506, and a wrapped payload 506. The functionality 502 may correspond to code and/or data that corresponds to the decoy nature of the decoy data as described above. For example, if the location aware active data 500 includes decoy data corresponding to an image file, the functionality 502 may correspond to the image data. In another example, if the location aware active data 500 includes decoy data corresponding to a server daemon, the functionality 502 may implement the server. In various embodiments, the functionality 502 is absent.

The unwrapping logic 504 may be executed to unwrap the wrapped payload 506, which in turn, may include exfiltration determination logic 508, reporting logic 510, an instance identifier 512, protective logic 514 and/or other data. The wrapped payload 506 may be encrypted (e.g., using symmetric or asymmetric cryptography), obfuscated, or otherwise transformed in some way that the content of the wrapped payload 506 is not decipherable or is not easily decipherable on inspection by a user or computer system. Thus, functionality of executable code within the wrapped payload may be unidentifiable. For example, the code flow of the wrapped payload 506 may be transformed in such a way that the reporting logic 510 and/or other portions of the wrapped payload 506 are hidden. In certain cases, some or all of the exfiltration determination logic 508, reporting logic 510, or the instance identifier 512 may be unwrapped rather than wrapped within the location aware active data 500. The exfiltration determination logic 508 is executed to determine whether the location aware active data 500 has been exfiltrated, i.e., determine whether the location aware active data 500 is executed upon a different computing device than a policy corresponding to the decoy data or data object allows. For example, the location aware active data 500 may be included with a data object as illustrated in FIG. 4. Furthermore, the service provider may maintain a white list of computer systems approved to interact with the data object. The exfiltration determination logic 508 may then determine whether the computer system is allowed to interact with the data object according to the policy. Although the functionality 502 is shown separately in FIG. 5, it is understood that in some embodiments, all or portions of the functionality 502 may be included within the wrapped payload 506.

The reporting logic 510 may be executed in response to determining that exfiltration has occurred. The reporting logic 510 initiates a transmission of an alert or notification to a central reporting site, which may be a component of the data storage service or computing resource service provider described above. The alert or notification may include identifying information to assist investigation of the exfiltration, such as the instance identifier 512 and/or information about the computing device upon which the reporting logic 510 is executed. The instance identifier 512 may uniquely identify the deployment and/or transmission of the location aware active data 500, which may be useful in determining which of the protected databases and/or protected data storage service, as described above, has been compromised. In some embodiments, the instance identifier 512 includes a cryptographic signature. It is noted that various data or code within the location aware active data 500 may be disguised via various steganographic techniques such as, for example, image steganography and audio steganography.

In its originally deployed environment, the location aware active data 500 may execute functionality 502 and may not disable or otherwise alter the performance of the computer systems in the deployed environment. The location aware active data 500 may verify that the execution environment embodies some predefined characteristics in the exfiltration determination logic 508. In various embodiments, within the originally deployed environment, the location aware active data 500 does not invoke the reporting logic 510. However, if the location aware active data 500 determines that exfiltration has occurred, the reporting logic 510 may be invoked to report identifying information to the central reporting site in order to aid in an investigation. The report or notification may indicate uniquely identifying information for the deployment. The central reporting site may take various actions in response to receiving such notifications. For example, the central reporting site may disable affected protected databases, quarantine affected protected databases, disable account access for user accounts associated with the exfiltration, send notifications to system administrators, send notification to law enforcement, and/or perform other actions.

Additionally, the protective logic 514 may, once exfiltration of that data object has been determined by the exfiltration determination logic 508, cause computer systems in the computing environment to operate in such a manner that the functionality 502 may be protected. For example, the protective logic 514 may cause the computer system to delete the functionality 502. In another example, the protective logic may cause the computer system to deplete computing resources of the computer system such that the computer system becomes inoperable. Additionally the protective logic 514 may determine the computer system is interacting with the location aware active data 500 in a sandboxed environment and destroy the location aware active data 500 or a portion thereof, such as the functionality 502, as a result.

Figure 6:
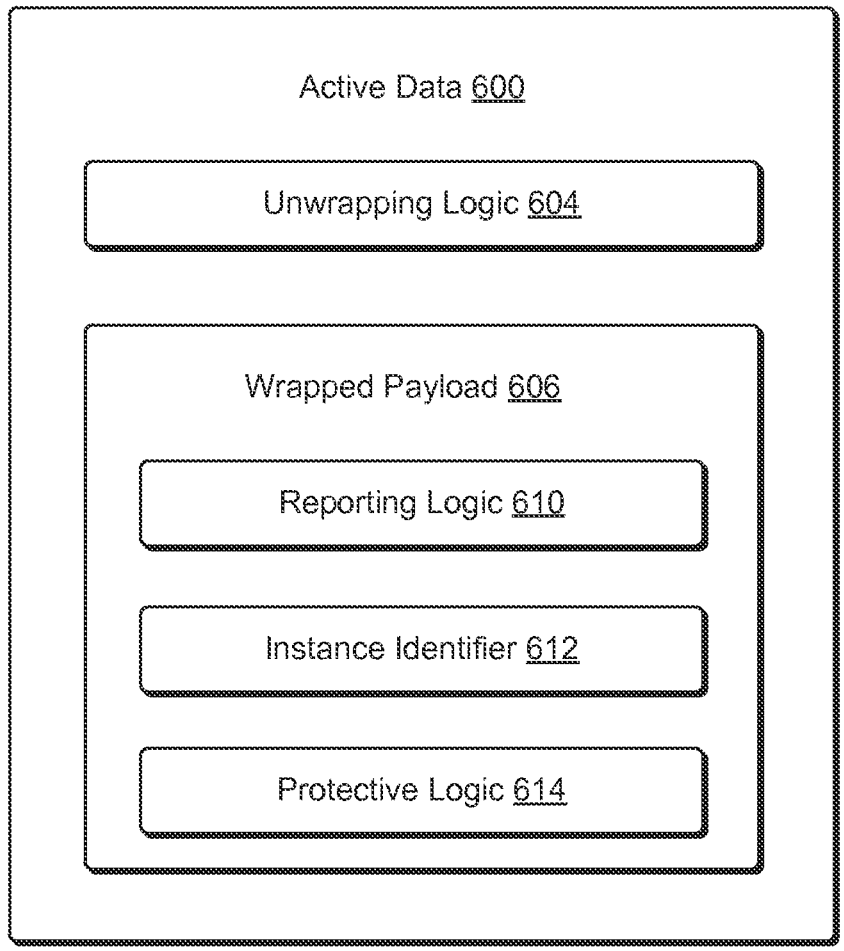
FIG. 6 is an example illustrating active data in accordance with an embodiment.

FIG. 6 is a diagram depicting an example of active data 600 according to an embodiment of the present disclosure. The mechanisms described herein may have application beyond the context of decoy data, identifying malicious activity, and protecting data objects in a database. For example, the active data 600 and location aware active data, as described above, may be used to protect other application or data objects, such as credentials stored in a password management application. Returning to FIG. 6, in this example the active data 600 includes unwrapping logic 604 and a wrapped payload 606. The wrapped payload 606 may include reporting logic 610, instance identifier 612, protective logic 614 and/or other data.

For example, the active data 600 may include a data object described above in connection with FIG. 4. The data object may include news stories, books, articles, video features, audio files, games, software programs, database records, credentials, and/or other forms of data. In unwrapping the wrapped payload 606, the unwrapping logic 604 may unwrap a portion of the data object along with a portion of the reporting logic 610 or protective payload 614. As portions of the data object are unwrapped, portions of the reporting logic 610 or protective payload 614 may be executed. By the time that the data object is fully unwrapped, the entirety of the reporting logic 610 or protective payload 614 may be executed. The reporting logic 610 may be configured, for example, to report data relevant to the computing resource service provider and/or data storage service as described above. In various embodiments, the protective logic 614 is executed as the wrapped payload 606 is unwrapped.

The active data 600 may be distributed, where at least a portion of the wrapped payload 606 is intended to be hidden or obfuscated from the user who obtains it. For example, the active data 600 may be included in records of a protected database. In other examples, the active data 600 may be included in decoy data as described above. Both the active decoy data and the active data 600 are intended to be fully executed and available when unwrapped by the user. The content of the wrapped payload 606 may be made available to the user, so that the reporting logic 610, protective logic 614, and/or other logic is executed by a computing device operated by the user. Executing of the protective logic 614 may cause the computing device to be rendered inoperable and/or permanently disabled. Other levels of protective logic 614 may be used in accordance with the present disclosure. For example, the protective logic 614 may cause the computing device to utilize computing resources in a detectable pattern which may indicate that the user has attempted to access a data object without authorization. The pattern may include a pattern detectable by virtual machine management service or network computing resource metrics service.

Figure 7:
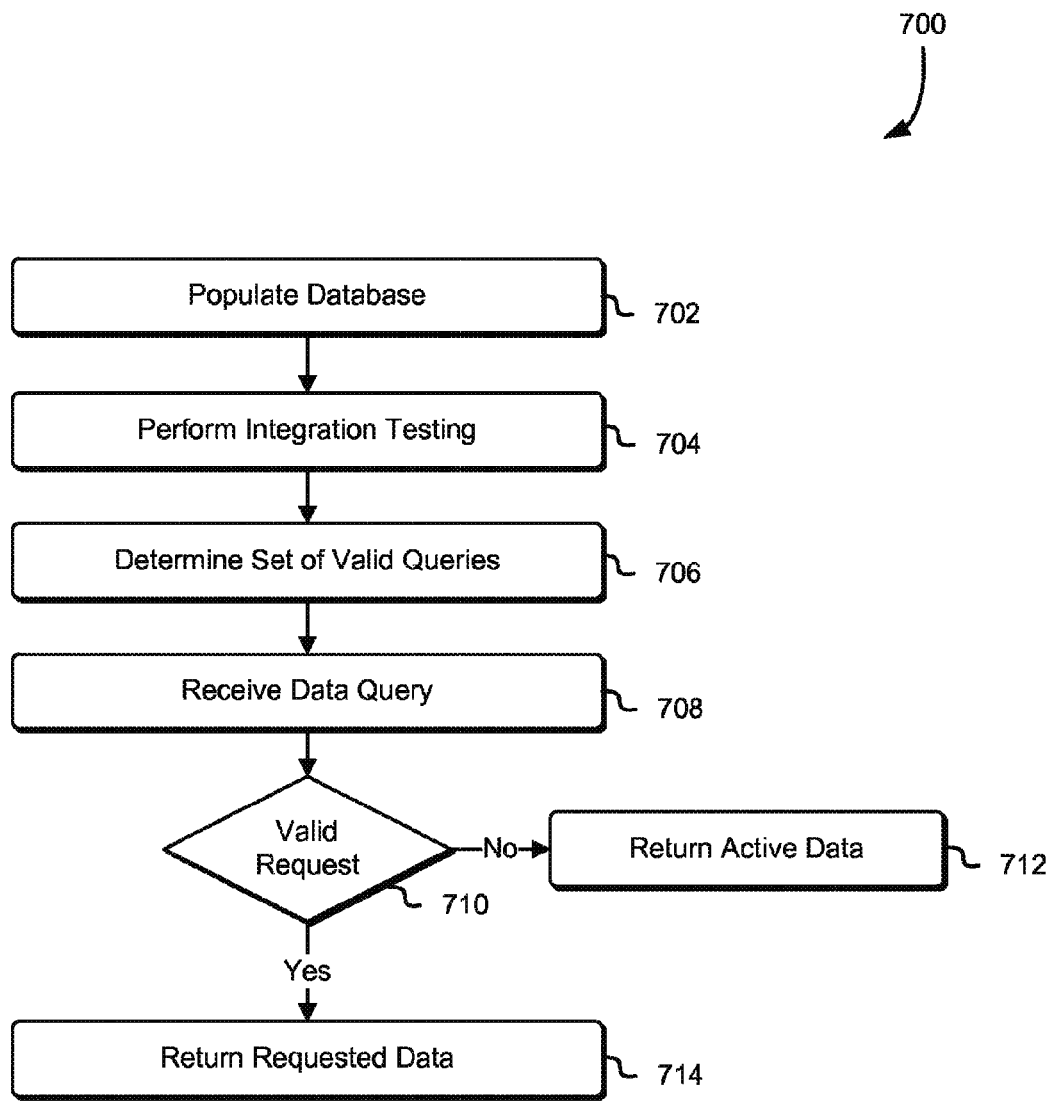
FIG. 7 illustrates an example process for determining to provide, in response to a request, active data or requested data in accordance with an embodiment.

FIG. 7 shows an illustrative example of a process 700 which may be used to protect data objects stored in a protected database in accordance with an embodiment of the present disclosure. The process 700 may be performed by any suitable system or combination of systems such as the data storage service and protected database described above in connection with FIG. 2. Returning to FIG. 7, in an embodiment, the process 700 includes populating a database 702. Populating the database may include generating decoy data comprising active data as described above. Additionally, all or at least a portion of the data objects populating the database may include active data. The data storage service may then perform integration testing 704. The integration testing is used to determine a set of queries and/or interaction with the data storage service that may be allowed by the data storage service. For example, the integration testing may enable the data storage service to determine a set of queries that are commonly used by users of the data storage service. The commonly used queries may be used to generate one or more constraints defining a set of allowable queries to the data storage service. The data storage service may return active data as a result of receiving a query not included in the set of allowable queries.

Returning to FIG. 7, the data storage service may determine a set of valid queries 706. The set of valid queries may be based at least in part on the results of the integration testing. Furthermore, the set of valid queries may be determined based at least in part on a value or set of values to be included in a valid query. The data storage service may then receive a data query 708. The query may be received from a computing device operated by a user. Furthermore, the data query may be associated with a user, for example, the query may include a set of credentials such as a user name and password. The data storage service may then determine if the received query is valid 710. For example, the data storage service may determine if the user name and password or other credentials included in the request are valid. In another example, the data storage service may determine if the query is valid based at least in part on information corresponding to the query, such as a network address or other identification information associated with the computing device responsible for submitting the request to the data storage service. In yet another example, the data storage service may determine if the query is valid based at least in part on the determined set of valid queries as described above. If the query is invalid, the data storage service may return active data 712. The active data, as described above, may be configured to disable the computing device of the requestor. If the query is valid, the data storage service may return the requested data 714.

Figure 8:
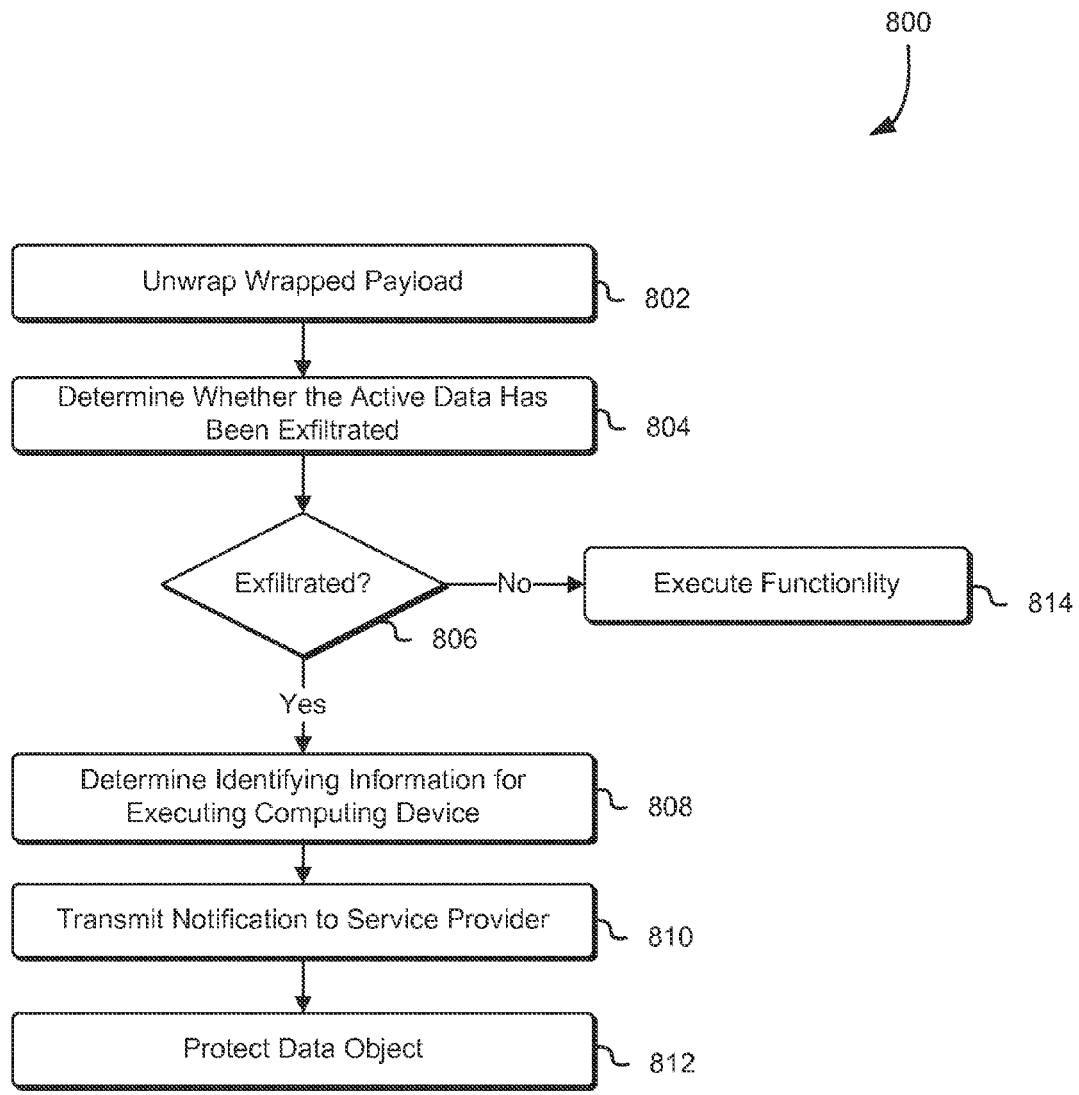
FIG. 8 illustrates an example process for executing functionality of location aware active data in accordance with an embodiment.

FIG. 8 shows an illustrative example of a process 800 which may be used to protect data objects stored in a protected database by utilizing active data in accordance with an embodiment of the present disclosure. The process 800 may be performed by any suitable system or combination of systems such as the data storage service and protected database described above in connection with FIG. 2. Returning to FIG. 8, in an embodiment, the process 800 includes unwrapping a wrapped payload 802. The wrapped payload may be included in active data as described above. The active data may be executed in a variety of ways, with both express and implicit triggers. For example, a user may expressly download and execute the active data in an attempt to interact with a data object. By contrast, an implicit trigger may include automatic execution triggered by some agent that may already be deployed to the computing device operated by the user. For example, the active data may be configured to execute in response to an interaction or attempt to interact with the data object.

The computing device interacting with the active data may execute the unwrapping logic, as described above, in order to unwrap the wrapped payload. The wrapped payload may, for example, contain exfiltration determination logic, reporting logic, an instance identifier, protective logic, and/or other data as described above. The active data may include executable code that, when executed by the computing device may cause the computing device to determine whether the active data has been exfiltrated or otherwise obtained in an unauthorized manner 806. For example, the active data may examine the computing environment in which the active data is executed to determine whether one or more characteristics of the computing device to which the active data was deployed is present. Such characteristics may comprise the presence or absence of defined characteristics such as, for example, a predefined file, a predefined registry flag, a predefined modification to a file, a type of image expected to be captured via a camera, a network host expected to be unreachable via the internal network, and/or other characteristics. The active data may communicate with a network service in order to determine if the active data has been exfiltrated. For example, the active data may present certain identifying information obtained from the computing environment, and the network service may return a result that indicates whether the exfiltration has occurred based at least in part on the identifying information.

If, as a result of the computing device executing the exfiltration determination logic, the active data determines that exfiltration has occurred, the active data may then determine identifying information for the executing computing device. If, the active data determines that exfiltration has not occurred, the active data may instead execute the functionality 814. Executing the functionality may include providing the computing device with access to the data object. In some embodiments, the exfiltration determination may be implicit. For example, the active data may be configured to throw an exception due to an instruction pointer pointing out of bounds when the active data is executed on a device other than the target device. The exception handler may then perform the reporting functions and/or protective functions.

The active data may then determine identifying information for the computing device upon which the active data is executed 808. For example, the active data may determine an IP address, geographic coordinates, contact information, installed applications, information from the user data, and/or other data that may be used to identify the computing device or the user operating the computing device. The active data may then cause the computing device to transmit a notification to the computing resource service provider 810. For example, the active data may initiate a defined action, such as a transmission of a notification or alert to a central reporting site. In another example, the active data may send a "beacon" of information back to the central reporting service via the network or cause the computing device to perform in such a way that the computing device "beacons" information back to a central reporting service such as spinning up and down the computing device's fans in a particular pattern. The information may include the identifying information for the computing device and potentially the instance identifier or other information that uniquely identifies the original deployment of the active data. The active data may send the "beacon" of information to a remote reporting service if, for example, the central reporting service is inaccessible to the computing device. In one embodiment, the computing device is not connected to, or is no longer connected to, the network. In another example, the active data may emit the "beacon" of information via a speaker, where the notification or alert data is encoded within an acoustic signal. The active data may then cause the computing device to execute the protective logic and protect the data object 812. Protecting the data may include a variety of operations encoded in the protective logic as described above.

Figure 9:
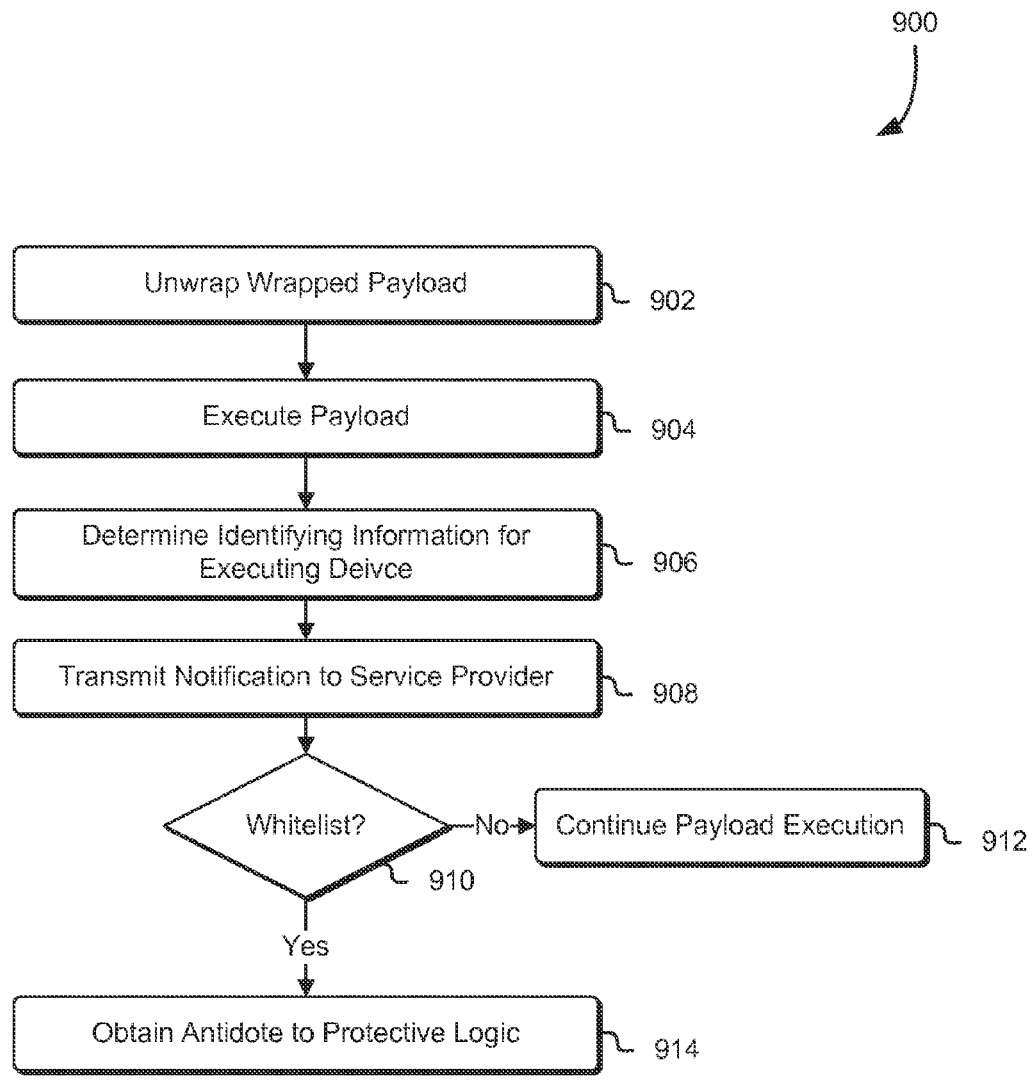
FIG. 9 illustrates an example process for providing an antidote to the functionality of active data in accordance with an embodiment.

FIG. 9 shows an illustrative example of a process 900 which may be used to protect data objects stored in a protected database by utilizing active data in accordance with an embodiment of the present disclosure. The process 900 may be performed by any suitable system or combination of systems such as the data storage service and protected database described above in connection with FIG. 2. Returning to FIG. 9, in an embodiment, the process 900 includes unwrapping the wrapped payload 902. The payload may be unwrapped as a result of the computing device interacting with the data object comprising the active data. Unwrapping the payload may cause the computing device to execute the payload 804. The payload may include one or more functions or executable logic as described above. For example, the payload may include exfiltration determination logic, reporting logic, an instance identifier, protective logic, and/or other data.

The execution of the payload may cause the active data to determine identifying information for the executing computing device 906. For example, the active data may determine an IP address, geographic coordinates, contact information, installed applications, information from the user data, and/or other data that may be used to identify the computing device or the user operating the computing device. The active data may then cause the computing device to transmit a notification to the computing resource service provider 908. For example, the active data may initiate a defined action, such as a transmission of a notification or alert to a central reporting site. The computing resource service provider or central reporting service may then return information to the computing device indicating whether the computing device is authorized to interact with the data object or otherwise protected from the protective logic included in the payload of the active data. For example, the computing device may be part of a health care provider network and should not be disabled by the protective logic.

If the returned information indicates that the computing device is whitelisted 910, the computing device may obtain an antidote to the protective logic. For example, the computing device may obtain, from the computing resource service provider, executable code that, when executed by one or more processors of the computing device, disables the protective logic and/or cures any errors created by the protective logic. If the returned information indicates that the computing device is not whitelisted 910, the computing device may continue execution of the payload. Execution of the payload may cause the computing device to execute the protective logic which may be configured to disable or otherwise protect the data object from access by the computing device.

Figure 10:
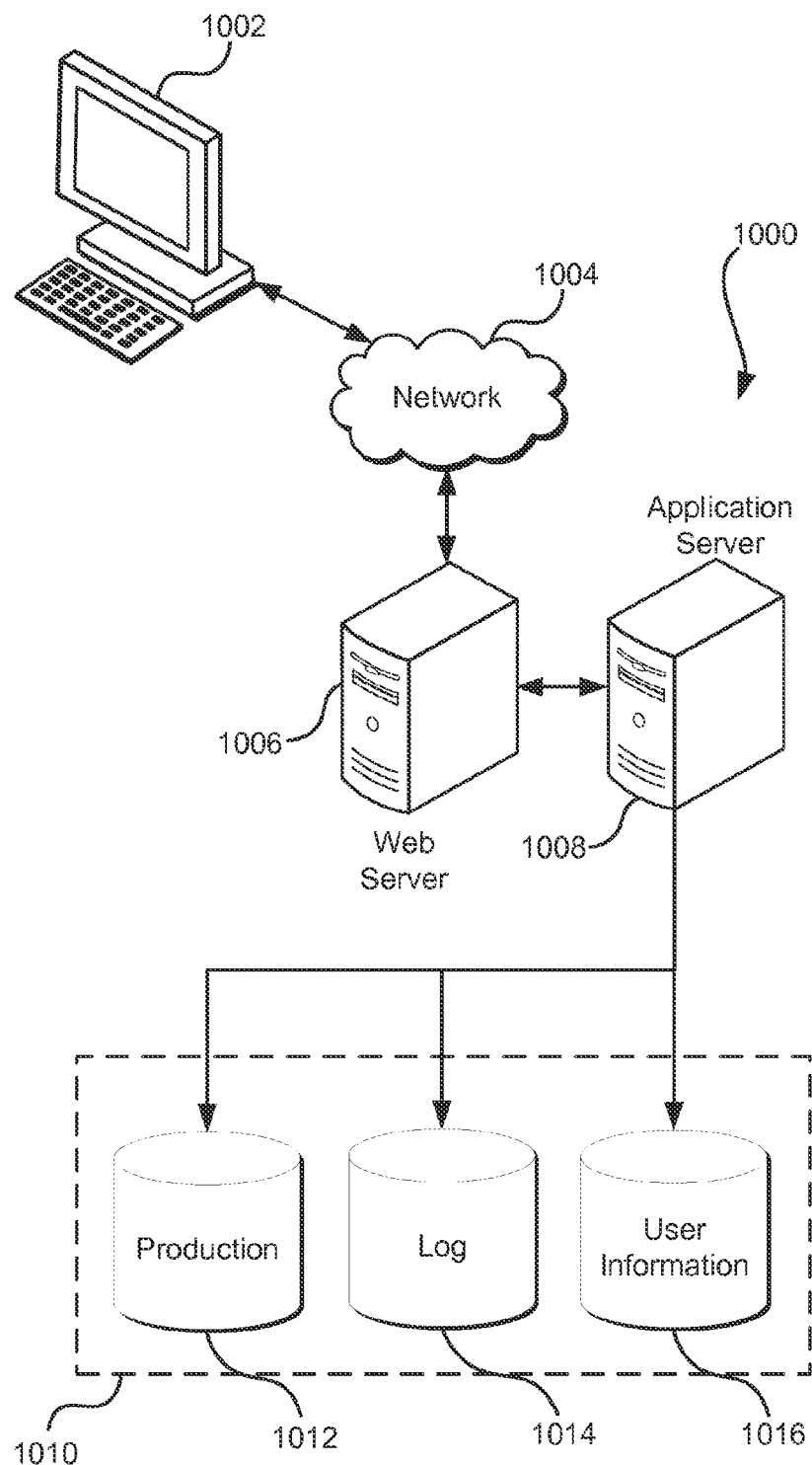
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    under the control of one or more computer systems configured with executable instructions,
        receiving, at an interface of a data storage service, a request to interact with a data object maintained by the data storage service;
        determining that the request violates one or more constraint conditions based at least in part on the request by at least determining that the request lacks a value indicated by the one or more constraint conditions as to be included in requests; and
        providing, in response to the request, obfuscated active decoy data, as a result of the determination, where the obfuscated active decoy data comprises a payload containing code that is configured to cause depletion of one or more resources used by a computer system executing the code.

2. The computer-implemented method of claim 1, wherein depletion of the one or more resources used by the computer system executing the code further includes exhaustion of a hard disk capacity of the computer system and a network capacity of the computer system.

3. The computer-implemented method of claim 1, wherein depletion of one or more resources used by the computer system executing the code further includes exhaustion of a memory of the computer system and exhaustion of a processing capacity of the computer system.

4. The computer-implemented method of claim 1, wherein the value includes a flag in the request.

5. A system comprising:
one or more processors; and
memory that stores computer-executable instructions that, if executed, cause the one or more processors to:
receives a request to access at least one data object maintained by a data vending service;
determines to provide active data in response to the request based at least in part on the request violates one or more constraint conditions by at least determining that the request lacks a value indicated by the one or more conditions, wherein the active data comprises code that is configured to cause depletion of computing resources of a computer system interacting with the active data; and
provides the active data in response to the request.

6. The system of claim 5, the system further determines a particular level of active data to provide in response to the request, where the particular level corresponds an amount of computing resource depletion to be caused by the active data.

7. The system of claim 5, wherein the active data further causes the computer system interacting with the active data to generate a signal detectable by one or more services.

8. The system of claim 5 further:
determines that the computer system interacting with the active data is included in a whitelist of computer systems; and
provides an antidote to the active data in response to the determination.

9. The system of claim 5 further provides to the computer system interacting with the active data an antidote to the active data, where the code included in the active data is further configured to detect the antidote and prevent depletion of computing resources of the computer system interacting with the active data.

10. The system of claim 5, wherein the request to access the at least one data object further includes a database query in violation of the one or more constraint conditions.

11. The system of claim 5, wherein the active data further causes the computer system interacting with the active data to transmit a notification including identifying information of the computer system to at least one service of the one or more services.

12. The system of claim 5 further interleaves active data into one or more data objects maintained by the data vending service.

13. A non-transitory computer-readable storage medium having stored thereon executable instructions that, when executed by one or more processors of a computer system, cause the computer system to at least:
receive a request to interact with at least one data object of a set of data objects;
determine the request violates one or more constraint conditions by at least determining that the request lacks a value indicated by the one or more constraint conditions as to be included in the request; and
provide, in response to the request, at least one active data object of a set of active data objects, where at least a portion of the active data objects of the set of active data objects includes executable code that when executed by another computer system prevents the other computer system from interacting with at least one data object of the set of data objects.

14. The non-transitory computer-readable storage medium of claim 13, wherein the instructions further comprise instructions that, when executed by the one or more processors, cause the computer system to include in the portion of the active data objects of the set of active data objects, executable code that, when executed by the other computer system, causes the other computer system to transmit information identifying the other computer system to a reporting service.

15. The non-transitory computer-readable storage medium of claim 13, wherein the instructions further comprise instructions that, when executed by the one or more processors, cause the computer system to include in the portion of the active data objects of the set of active data objects, executable code that, when executed by the other computer system, causes the other computer system to encrypt data stored in memory of the other computer system.

16. The non-transitory computer-readable storage medium of claim 13, wherein the instructions further comprise instructions that, when executed by the one or more processors, cause the computer system to include in the portion of the active data objects of the set of active data objects, executable code that, when executed by the other computer system, causes the other computer system to delete one or more data objects of the set of data objects stored in memory of the other computer system.

17. The non-transitory computer-readable storage medium of claim 13, wherein the instructions that cause the computer system to determine the request violates one or more constraint conditions further include instructions that cause the computer system to:
determine the request was submitted by an attacker; and
provide an active data object of the set of active data objects including executable code that, when executed by the other computer system, causes the other computer system to be at least temporarily inoperable.

18. The non-transitory computer-readable storage medium of claim 13, wherein the instructions further comprise instructions that, when executed by the one or more processors, cause the computer system to populate a storage system with the set of active data objects, where the set of active data objects are obfuscated such that the set of active data objects are not distinguishable from the set of data objects of the storage system without transforming the obfuscated active data objects.

19. The non-transitory computer-readable storage medium of claim 13, wherein the instructions further comprise instructions that, when executed by the one or more processors, cause the computer system to provide an antidote to the at least one active data object of the set of active data objects.

20. The non-transitory computer-readable storage medium of claim 13, wherein the instructions further comprise instructions that, when executed by the one or more processors, cause the computer system to include in the portion of the active data objects of the set of active data objects, executable code that, when executed by the other computer system, causes the other computer system to:
determine whether the at least one data object of the set of data objects has been exfiltrated from the computer system; and perform one or more operations by at least executing the executable code included in the portion of the active data objects.

* * * * *